(12) United States Patent
Durrin (10) Patent No.: US 6,575,485 B2
(45) Date of Patent: Jun. 10, 2003

(54) SUSPENSION SYSTEM FOR A BICYCLE TRAILER

(76) Inventor: Greg R. Durrin, 81 Terry La., Selah, WA (US) 98942

(*) Notice: Subject to any disclaimer, the term of this patent is extended or adjusted under 35 U.S.C. 154(b) by 0 days.

(21) Appl. No.: 09/850,900

(22) Filed: May 7, 2001

(65) Prior Publication Data

US 2002/0163158 A1 Nov. 7, 2002

(51) Int. Cl.[7] .............................................. B62K 27/00
(52) U.S. Cl. .............................. 280/204; 280/124.128; 280/292
(58) Field of Search ............................... 280/204, 292, 280/124.128, 656

(56) References Cited

U.S. PATENT DOCUMENTS

| | | | | |
|---|---|---|---|---|
| 1,251,866 A | * | 1/1918 | Cordaro | |
| 2,080,546 A | * | 5/1937 | Rudoni | 280/124.128 |
| 2,494,144 A | * | 1/1950 | Restall | 280/124.128 |
| 2,988,382 A | * | 6/1961 | Holland | 280/400 |
| 3,761,109 A | * | 9/1973 | Campbell | 280/124.128 |
| 3,840,085 A | * | 10/1974 | Smith | 280/204 |
| 4,522,425 A | * | 6/1985 | Cornwall et al. | 280/124.128 |
| 4,536,001 A | * | 8/1985 | Wagner | 280/65 |
| 4,679,807 A | * | 7/1987 | Raybon | 280/204 |
| 5,984,332 A | * | 11/1999 | Beaudoin et al. | 280/647 |

FOREIGN PATENT DOCUMENTS

JP 58-161671 * 9/1983 ................ 280/204

* cited by examiner

Primary Examiner—Daniel G. DePumpo
(74) Attorney, Agent, or Firm—Stratton Ballew PLLC (57) ABSTRACT

A shock absorbing suspension system for a lightweight, bicycle pulled trailer, fitted to the frame of a light weight trailer. The trailer suspension system includes a pair of shock absorbers each mounted to cushion the trailer and its contents, which can be a passenger. The suspension system mounts to a trailer frame that has a shock base and an arm base. The shock base includes a shock base pivot and the arm base includes an arm base pivot. A wheel arm attaches to the arm base of the trailer frame. The wheel arm includes a hub end and a pivot end, and the pivot end hingably connects to the arm base pivot. A wheel hub is received into the wheel arm proximate the hub end of the wheel arm. An arm shock bearing is positioned on the wheel arm. A shock, for dampening the hinging of the wheel arm about the arm base pivot, is mounted between the trailer frame and the wheel arm. The shock includes a base bearing and an arm bearing. The base bearing hingably mounts to the shock base pivot, and the arm bearing hingably mounts to the arm shock pivot.

17 Claims, 7 Drawing Sheets

SUSPENSION SYSTEM FOR A BICYCLE TRAILER

TECHNICAL FIELD

The invention provides a suspension system uniquely suited for a bicycle trailer. More particularly, to a shock absorbing actuator system, fitted to the frame of a light weight trailer.

BACKGROUND OF THE INVENTION

Bicycle pulled trailers are becoming increasingly popular for carrying young passengers or light cargo. These trailers are typically light in weight to minimize the burden to the rider of the bicycle. Bicycle trailers conventionally include a tubular frame forming a platform for the attachment of two opposing wheels that follow parallel tracks and sometimes share a common axle. The frame attaches to the pulling bicycle with a hitch on a connecting arm.

The trail bicycle or "mountain bike" is a relatively new version of a bicycle that typically includes a suspension system for the front forks, or in some cases the rear wheel of the bicycle. However, current bicycle trailer systems are only practicable on smooth road and trail surfaces. In some instances, especially for extended excursions over rough trails with mountain bikes, it would be desirable to pull additional equipment and provisions, or perhaps a passenger with a trailer.

Bounce and vibration are a typical problem with conventional bicycle trailers. The two wheels of the trailer travel in parallel and independent tracks. The trailer bounces up and down, and side to side as any obstacle is encountered. This makes pulling such a trailer difficult, as the trailer sways and jostles. Riding in a conventional bicycle trailer as a passenger in the trailer is also very uncomfortable. A bicycle trailer is needed that somehow reduces these difficulties. Specifically, a need exists for a lightweight, bicycle pulled trailer that can handle rougher and varying terrain, as encountered on off-road trails.

SUMMARY OF INVENTION

The invention provides a suspension system for a bicycle trailer. More particularly, to a shock absorbing suspension system fitted to the frame of a light weight trailer. The suspension system mounts to, and so includes a trailer frame. For the present invention, the trailer frame has a shock base and an arm base. The shock base includes a shock base pivot. The arm base also includes an arm base pivot. A wheel arm attaches to the arm base of the trailer frame. The wheel arm includes a hub end and a pivot end, and the pivot end hingably connects to the arm base pivot. A wheel hub is received into the wheel arm proximate the hub end of the wheel arm. An arm shock bearing positioned on the wheel arm.

A shock is mounted between the trailer frame and the wheel arm. The shock dampens the hinging of the wheel arm about the arm base pivot. The shock has a compressible length and includes a base bearing and an arm bearing. The base bearing hingably mounts to the shock base pivot, and the arm bearing hingably mounts to the arm shock pivot.

Alternatively, the trailer frame of the suspension system can include a shock frame extension. The shock base pivot is mounted on the shock frame of the trailer frame.

In a preferred alternative of the present invention, the wheel arm can further include a flange, the flange mounted on the wheel arm proximate the pivot end of the wheel arm. The flange includes the arm shock pivot. The arm bearing hingably mounts to the flange of the wheel arm at the arm shock pivot.

The present invention provides a suspension system for a lightweight, bicycle pulled trailer, uniquely configured to handle rougher and varying terrain, especially as encountered on off-road trails. The suspension system dampens the bouncing and vibrations typical of conventional bicycle trailers. Specifically, the trailer suspension system of the present invention includes a pair of shock absorbers each mounted to cushion the trailer and its contents, which can be a passenger.

The invention will be better understood by reference to the following detailed description taken in conjunction with the accompanying drawings.

DETAILED DESCRIPTION OF SPECIFIC EMBODIMENTS

Figure 3:
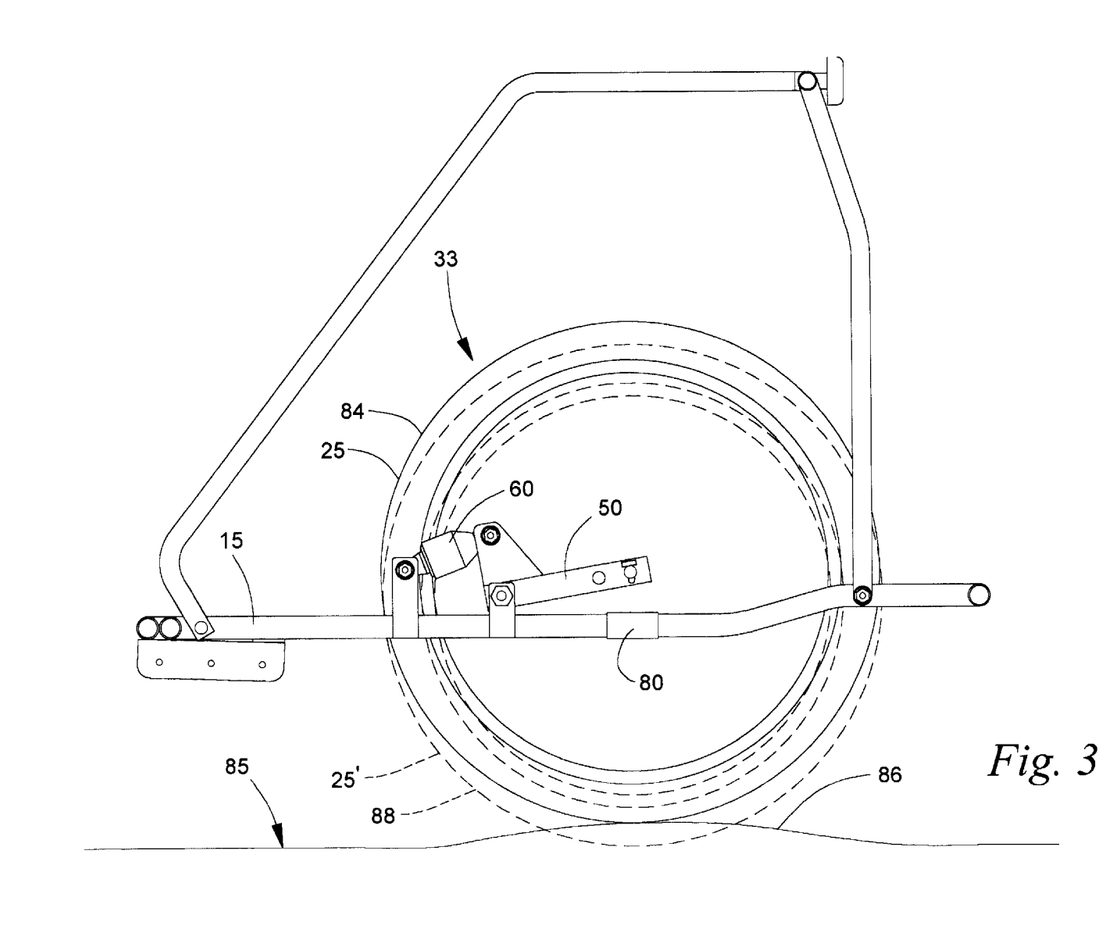
FIG. 3 is a side elevation diagram of a suspension system for a lightweight trailer, according to an embodiment of the present invention.
Figure 4:
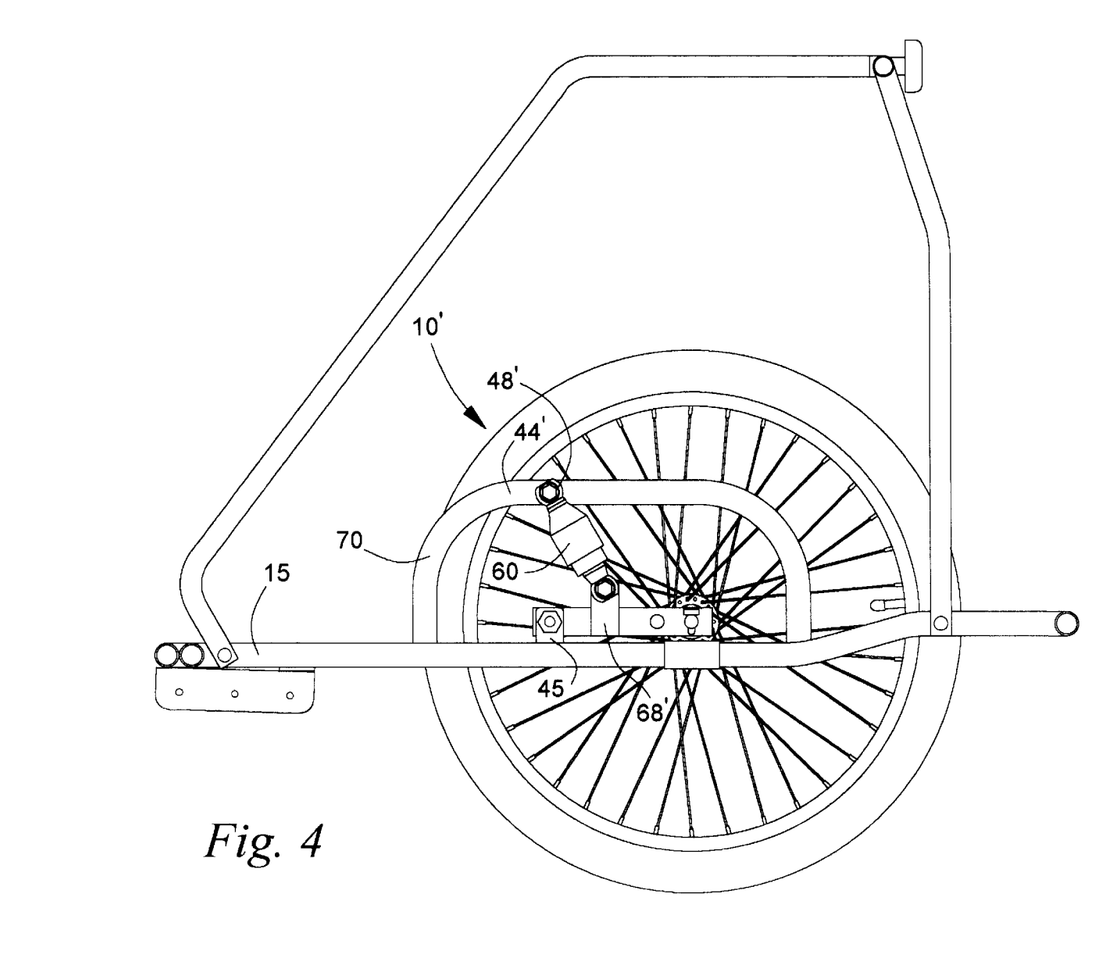
FIG. 4 is a side elevation diagram of a suspension system for a lightweight trailer, according to an embodiment of the present invention.
Figure 5:
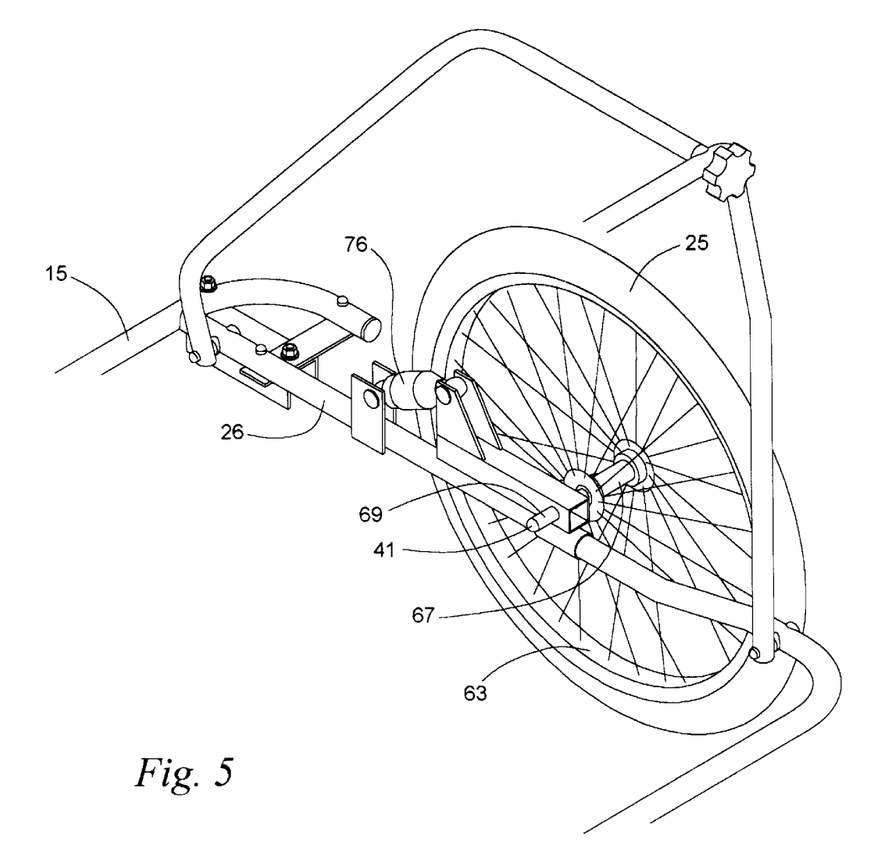
FIG. 5 is a perspective diagram of a portion of a suspension system for a lightweight trailer, according to an embodiment of the present invention.
Figure 6:
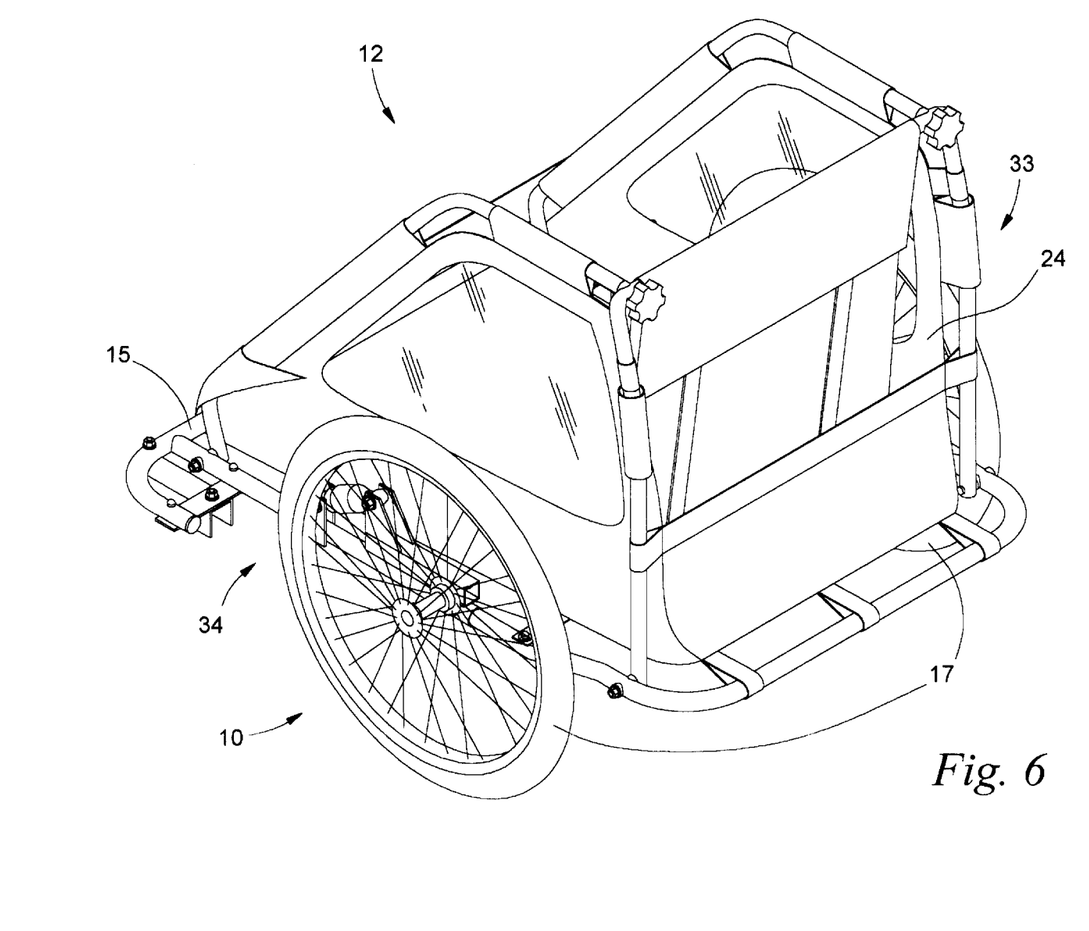
FIG. 6 is a perspective diagram of a suspension system for a lightweight trailer, according to an embodiment of the present invention.

FIGS. 1 through 7 show a suspension system 10 for a lightweight trailer 12, according to embodiments of the present invention. The suspension system mounts to a trailer frame 15. The lightweight trailer preferably includes a pair of wheels 17, as shown in FIGS. 5 and 6.

The trailer frame 15 is preferably manufactured from a tubular material, and most preferably fabricated from aluminum tubing; specifically a 6063, T832 type of aluminum tubing, as manufactured by EASCO of Girard, Ohio, U.S.A., and having an approximate wall thickness of 0.058 inches (1.5 mm). The trailer frame is preferably formed to receive a trailer cover 24, which is shown in FIG. 6. Alternatively, the trailer cover may be replaced by, or include a pack bag, a cargo container or a passenger seat.

As shown in FIG. 5, the lightweight trailer 12 for use with the present invention preferably includes a first wheel mounted 25 to a first side 26 of the trailer frame 15 and a second wheel 30 mounted to a second side 31 of the trailer frame. The first wheel mounts to the first side of the frame within a first suspension assembly 33, and the second wheel mounts to second side of the trailer frame within a second suspension assembly 34. The first shock assembly and the second shock assembly together form suspension system 10 of the present invention. The first shock assembly and the second shock assembly are positioned in a paired configuration, preferably side-by-side, with a mirrored set of components. Alternatively, it is considered that a single shock assembly could be employed along a single axle interconnecting the pair of wheels.

Figure 1:
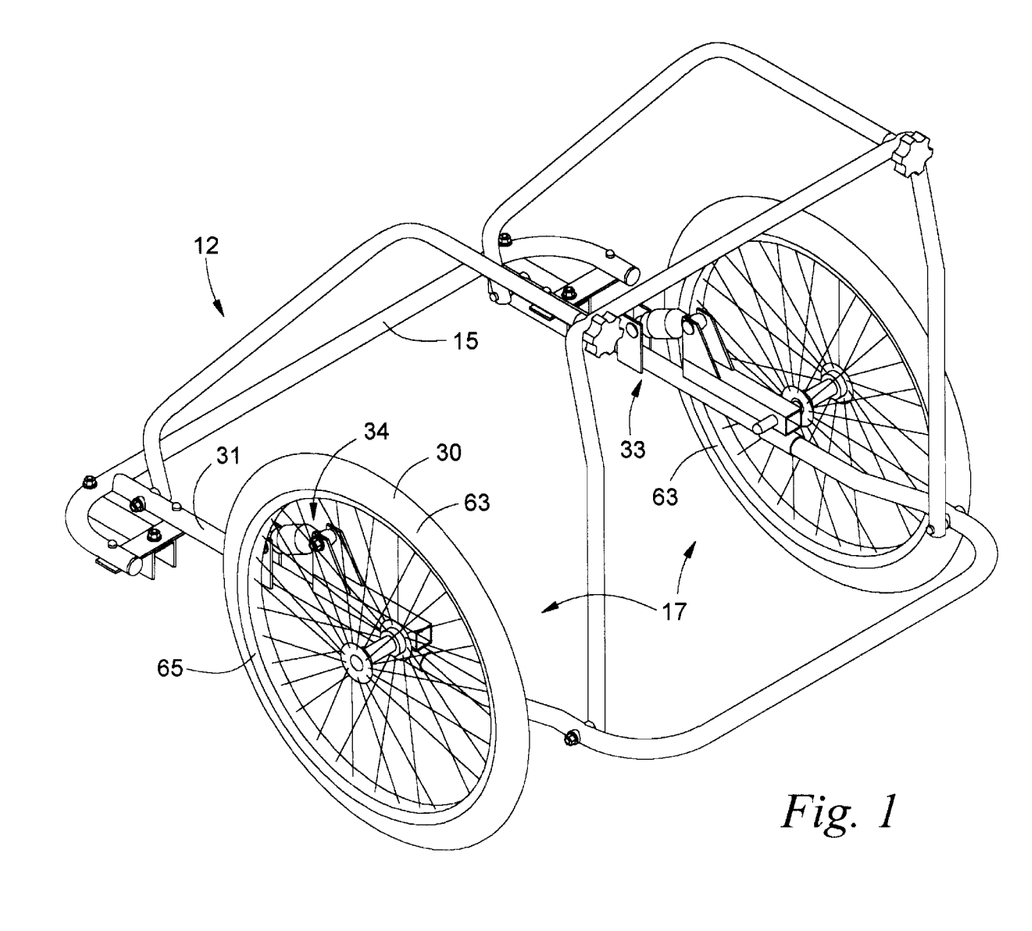
FIG. 1 is a perspective diagram of a suspension system for a lightweight trailer, according to an embodiment of the present invention.
Figure 2:
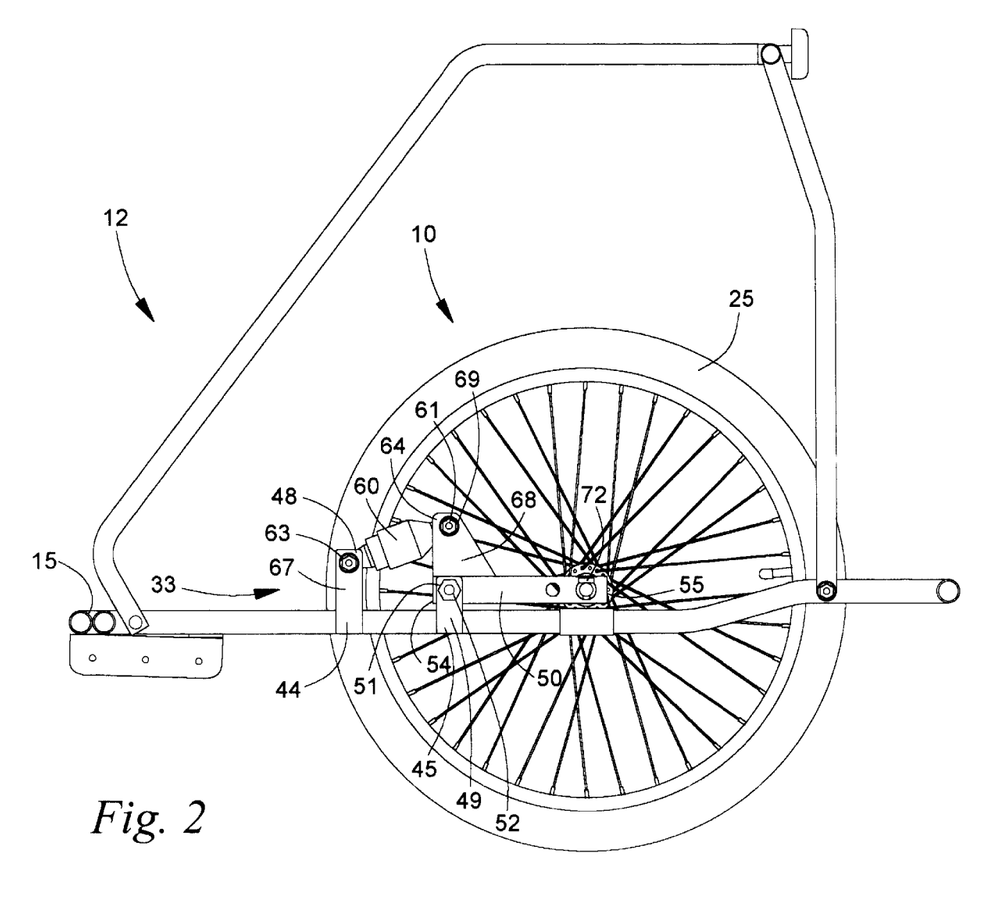
FIG. 2 is a side elevation diagram of a suspension system for a lightweight trailer, according to an embodiment of the present invention.

A preferred embodiment of the present invention includes a side-by-side, paired configuration of the first suspension assembly 33 and the second suspension assembly 34, each mounted on opposing sides of the trailer frame 15. For clarity, the suspension system components in their preferred and alternative configurations, are herein described in a singular configuration, without specific reference to the first suspension assembly versus the second suspension assembly, as the two assemblies essentially mirror each other. As shown in FIGS. 1 and 2, the suspension system 10 includes a shock base 44 and an arm base 45. The shock base and the arm base both extend from the trailer frame. Most preferably, the configuration of the first suspension assembly is mirrored for the second suspension assembly 34, with the shock base and the arm base of the second suspension assembly extending from the second side 27 of the trailer frame, as shown in FIGS. 5 and 6.

The shock base 44 and the arm base 45 are preferably metal plates, welded to the trailer frame 15. However, alternative materials for the bases, such as plastic, and alternative component shapes for the bases, such as tubes or bar stock are considered for use with the present invention Alternative ways of attaching the respective bases to the trailer frame are also considered, such as bolts, brackets, clamps or rivets.

The shock base includes a shock base pivot 48, and the arm base includes a base arm flange 49. As shown in FIG. 1, a wheel arm 50 attaches to the arm base 45 at the base arm flange to form a base arm pivot 51. The wheel arm includes a hub end 53 and a pivot end 54. Specifically, the pivot end of the wheel arm hingably connects to the base arm flange. The base arm pivot preferably includes a base arm bolt 52 or alternatively a pin, which passes through the base arm flange and the pivot end of the wheel arm, allowing the wheel arm to hinge about the arm base.

The pair of wheels 17 for use with the present invention are preferably of a typical configuration and each include a tire 63, affixed to a spoked rim 65, as shown in FIG. 1. Each of the pair of wheels, namely the first wheel 25 and the second wheel 30, includes a hub 67 that is positioned at the center of each wheel's spoked rim. As detailed in FIG. 5, the hub receives an axle piece 69. The axle piece is preferably formed from short length of steel rod. Most preferably, the steel rod is a stainless steel alloy selected for high tensile strength and resistance to rust. The axle piece has an axle end 41 that extends from the hub for attachment to the wheel arm 50. The axle end is received into a wheel arm bearing 71 on the wheel arm proximate to the hub end 53 of the wheel arm. Preferably, the wheel rotates freely within the wheel arm bearing. Alternatively, the wheel can rotate on the axle piece and the axle piece can be held securely within the wheel bearing. Any conventional mechanism could be employed with the present invention that allows the rotation of the wheel on its attachment to the wheel arm.

To secure the axle piece 69 within the wheel arm bearing 71, a hub pin 72 is preferably employed. The hub pin inserts into the exposed axle end 41 as shown in FIG. 5, to prevent the axle piece from working out of the wheel arm 50. Any alternative pin mechanism, hub piece or cap could be utilized instead of the hub pin to retain the axle piece within the wheel arm bearing.

For the present invention, each of the pair of wheels 17 rotate freely on their respective wheel arms 50 as each wheel arm hinges independently about their attached base arm pivots 51. The hinging movement of each wheel arm on their base arm pivot is dampened by a shock absorber 60. The shock absorber is simply referred to herein as the "shock." The shock hingably connects to the wheel arm to form an arm shock pivot 61. To provide a mechanical advantage, the arm shock pivot is preferably positioned proximate to the pivot end 54 of the wheel arm.

The shock 60 mounts between the trailer frame 15 and the wheel arm 50 to dampen the action of the wheel arm, as the wheel arm pivots about the base arm pivot 51. The shock has a compressible length and includes a base shock bearing 63 and an arm shock bearing 64. As a primary dampening mechanism the shock may include any conventional dampening mechanisms, which typically includes a piston or actuator whose action is countered by such alternatives as a spring, or a gas or liquid-filled dampener, alone or in combination. Alternatively, or in addition to these primary dampening mechanisms, the shock can utilize a semisolid elastomeric or ruber-like material for further, secondary dampening. The shock can include any appropriate combination of mechanisms or materials to provide the needed dampening as the shock compresses and extends, to limit travel and vibration in the wheel arm, as the wheel arm hinges about the base pivot. Both gas or liquid reservoirs with a spring secondary dampener are considered for use with the present invention. However, a simple spring shock in a shock casing 76 for enclosing the spring, as shown in FIGS. 1 through 7, is most preferred. The shock casing is utilized to minimize any potential of pinching, as can be encountered in exposed springs. Additionally, the shock casing also helps to minimize fouling, which is especially a problem when the lightweight trailer 12 is used in wet or muddy conditions.

The base shock bearing 63 of the shock 60 hingably mounts to the trailer frame 15 at the shock base 44. Preferably, the shock base includes a shock base flange 67 that receives the base shock bearing to form the base shock pivot 48. At the opposing end of the shock 60, the arm shock bearing 64 hingably mounts to the wheel arm 50. Preferably, the wheel arm includes an arm flange 68 that receives the arm shock bearing to form the arm shock pivot 61. The arm shock pivot preferably includes an arm shock bolt 69, or alternatively a pin, passed through the arm flange and the base shock pivot, which allows the wheel arm and the shock to hinge about each other. Most preferably, as shown in FIGS. 1 and 2, the arm flange of the wheel arm extends away from the base arm pivot, to provide better placement of the shock for optimal mechanical advantage.

The specific shock 60 utilized for the suspension system 10 can be selected after evaluating the lightweight trailer with knowledge of the mechanical requirements for the suspension system 10, as a whole. Preferably, the shock is a standard, "off the shelf" shock absorber, as produced by an appropriate manufacturer. Mechanical requirements that can be considered in making an appropriate shock selection include the weights of the trailer and the wheels, and the expected contents carried within the trailer, as well as the expected roughness of the terrain on which the trailer is expected to travel with consideration to the smoothness of the ride desired. With these dampening specifications, the shock can be selected and sized to reflect the "force" and "displacement" requirements of the trailer through a routine selection process, well known to an engineer skilled in such selections. Displacement and force are terms well known in such a selection and relate to the amount of travel or displacement of the shock in relation to impact upon the shock.

The arm flange is not required to extend from the body of the wheel arm. In an alternative suspension system 10', a shock frame extension 70 protrudes from the trailer frame 15, as shown in FIG. 4. Like the preferred suspension system 10 discussed above, this alternative suspension configuration also operates to dampen the wheels of the lightweight trailer. For this alternative embodiment of the present invention, the trailer frame preferably includes two shock frame extensions, one shock frame extension attached to the first side 26 of the trailer frame and a second shock frame extension attached to the second side 31 of the trailer frame. The shock frame extensions each include an alternative shock base 44'. In this alternative embodiment, the shock base pivot 48 mounts to the alternative shock base on the shock frame extension of the trailer frame.

Additionally, for this alternative suspension system 10', an alternative arm flange 68' is located along the wheel arm 50. However, as compared with the preferred suspension system 10, the alternative arm flange is located further toward the hub end 53, but placed well away from the base arm pivot 51. The alternative suspension system is also preferably employed in a parallel pair of shocks 60 mounted to the trailer frame in a side-by-side configuration.

In the alternative suspension system 10', the alternative arm flange 68' is not required to extend away from the wheel arm 50 to gain a mechanical advantage. With the alternative shock base 44', the shock can be selected and sized for the specific force and displacement requirements of the trailer in a similar manner to the preferred embodiment, as shown in FIGS. 1 and 2.

As further detailed in FIG. 4, the shock base 40' the alternative suspension system 10' mounts to the shock frame extension 70, and the arm base 45 extends from the trailer frame 15. The shock frame extension provides a stable mounting point for the shock 60, and preferably has an inverted U-shape. The shock mounts to the alternative shock base 44' on the shock frame extension at an alternative shock base pivot 48'. The shock also mounts to the wheel arm at the arm base 45, which includes the base arm pivot 49.

The shock frame extension 70 and the arm base 45 are preferably welded to the trailer frame in the alternative suspension system 10', just as the shock base 44 and the arm bases are preferably welded to the frame for the preferred suspension system 10. However, alternative ways of attaching the respective bases to the trailer frame are considered, such as bolts, brackets, clamps or rivets. Also, for the alternative suspension system, the shock is preferably reversed in position, as shown in FIG. 4, to minimize the entry of dirt and moisture into the shock For additional dampening of the wheel arm 50 and attached wheel, which is either of the pair of wheels 17 that are suspended with the present invention, a bumper 80 can be utilized. As shown in FIG. 3, the bumper is mounted to the trailer frame. Preferably the bumper softens any contact between the hub end of the wheel arm and the trailer frame beneath it. The bumper can be any appropriate material for cushioning wheel arm. An elastomeric material such as neoprene is preferred for use as the bumper. However, any such material could be employed as an alternative. The bumper is not required if the wheel arm is restricted by the shock 60 and configuration of the suspension system 10 or alternative suspension system 10', to avoid impact with the trailer frame.

FIG. 3 specifically shows the first suspension assembly 33 in action. The first wheel 25, attached wheel arm 50 and shock 60 of the first suspension assembly are shown in an impacted position 84 as the attached trailer frame 15 of the light weight trailer 12 travels over a ground By surface 85. As a bump 86, or other such irregularity in the ground surface is encountered by the first wheel, the wheel elevates in response to the impact, as shown. The exact height the wheel rises in response to the bump depends upon the specific, engineered configuration of the suspension system, as discussed above, and includes such factors as the selected dampening characteristics of the shock 60. The shock compresses in the impacted position and then flexes or rebounds to an original position 88, as indicated by a rebounded first wheel 25', as shown in phantom line in FIG. 3.

Conversely, the second suspension assembly 34 functions in the same way described above for the first suspension assembly 33, to dampen the vertical movement of the second wheel 30 in response to impacts from the irregularities or bumps 86 in the ground surface 85. The alternative suspension system 10' also operates in the same general way as described above in regards to the preferred suspension system 10, with the wheel arm pivoting under the dampening control of the shock 60 in response to the ground surface's irregularities.

Figure 7:
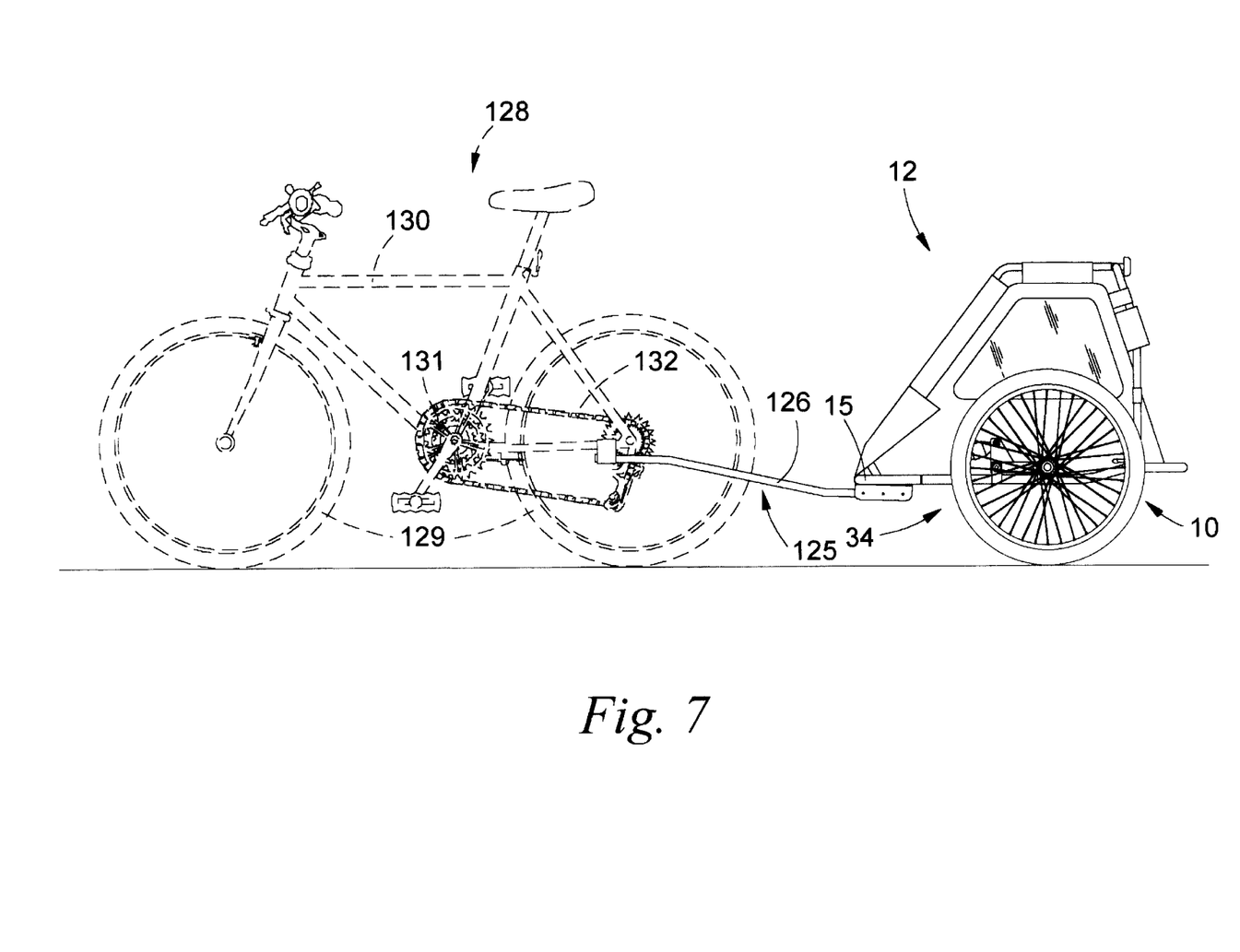
FIG. 7 is a side elevation diagram of a suspension system for a lightweight, bicycle pulled trailer, according to an embodiment of the present invention.

As is typical for bicycle pulled trailers, the trailer frame 15 of the present invention includes a bicycle attachment 125, as shown in FIG. 7. This bicycle attachment can be any conventional mount, but is typically an attachment bar or hitch arm 126 that extends from the trailer frame for mounting to a conventional bicycle 128. The conventional bicycle includes a pair of in-line wheels 129 mounted within a bicycle frame 130. The conventional bicycle is pedaled to provide rotational power to at least one of the pair of in-line wheels, and thereby propelling the bicycle forward.

The lightweight trailer 12 is clearly distinguishable from a bicycle frame 18, which is a central component of a conventional bicycle 19, as shown in FIG. 7. In contrast to the conventional bicycle frame, the trailer frame 15, as utilized with the present invention, lacks a crank 131, a chain 132 or any other means of supplying rotational power to either of the pair of wheels 17, of the lightweight trailer. More importantly, the wheels of a bicycle are mounted in series, front to back, while the pair of wheels of the lightweight trailer or any conventional trailer, are mounted in a parallel or side to side configuration. Lightweight trailers, as implemented with the present invention, are specifically configured for being towed, attached behind the bicycle or any similarly propelled device.

From the trailer frame 15, the hitch arm 126 terminates with a bicycle frame mount or a hitch 135. The hitch is preferably a clamp or bracket that receives the bicycle frame 130, but can be any mounting mechanism that attaches the hitch arm to the conventional bicycle 128, as an alternative.

For an additional alternative of the present invention, single wheeled light weight trailers are also considered for use with the present invention. The suspension system 10 of FIG. 1 or the alternative suspension system 10' of FIG. 4 could be employed without a second wheel 30. The single, first wheel 25 would be hingably mounted to the trailer frame 15 in substantially the same way the first wheel is attached as discussed above for either embodiment, but with the wheel centrally located in the trailer frame, rather than at the first side, as preferred.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited, except by the following claims, as appropriately interpreted in accordance with the doctrine of equivalents.

What is claimed is:

1. A suspension system for a light weight, bicycle pulled trailer comprising:
   a trailer frame including a shock base and an arm base,
      the shock base having a shock base pivot,
      the arm base having an arm base pivot;
   a wheel arm mounted above the trailer frame, the wheel arm having a hub end, a pivot end, and
   an arm shock pivot,
      the pivot end hingably connected to the arm base pivot;
   a wheel hub received into the wheel arm, proximate the hub end of the wheel arm;
   an arm shock bearing positioned on the wheel arm;
   a shock including a base bearing and an arm bearing,
      the shock having a compressible length,
      the base bearing hingably mounted to the shock base pivot,
      the arm bearing hingably mounted to the arm shock pivot, and
      the shock for dampening the hinging of the wheel arm about the arm base pivot; and
   an arm bumper mounted between the trailer frame and the wheel arm, the arm bumper for contacting the wheel arm as the shock extends.

2. The suspension system of claim 1, wherein:
   the trailer frame includes a shock frame extension, and the shock base pivot mounts on the shock frame extension, and the base bearing of the shock hingably mounts to the shock base pivot.

3. The suspension system of claim 1, the trailer frame further comprising:
   a second shock base and a second arm base,
      the second shock base having a second shock base pivot,
      the second arm base having a second arm base pivot;
   a second wheel arm having a second hub end, a second pivot end, and a second arm shock pivot,
      the second pivot end hingably connected to the second arm base pivot;
   a second wheel hub received into the second wheel arm, proximate the second hub end of the second wheel arm;
   a second arm shock bearing positioned on the second wheel arm; and
   a second shock including a second base bearing and a second arm bearing,
      the second shock having a compressible length,
      the second base bearing hingably mounted to the second shock base pivot,
      the second arm bearing hingably mounted to the second arm shock pivot, and
      the second shock for dampening the hinging of the second wheel arm about the second arm base pivot.

4. The suspension system of claim 3, wherein a second wheel rotates on the second wheel hub.

5. The suspension system of claim 3, wherein the second wheel arm further includes a second flange, the second flange mounted on the second wheel arm proximate the second pivot end of the second wheel arm, the second flange including the second arm shock pivot, and the second arm bearing of the second shock hingably mounts to the second flange of the second wheel arm at the second arm shock pivot.

6. The suspension system of claim 3, additionally including a second arm bumper mounted between the trailer frame and the wheel arm, the second arm bumper for contacting the second wheel arm, as the shock extends.

7. The suspension system of claim 3, wherein:
   the trailer frame includes a second shock frame extension, the second shock base pivot mounts on the second shock frame extension, and the second base bearing of the second shock hingably mounts to the second shock base pivot.

8. The suspension system of claim 1, wherein a wheel rotates on the wheel hub.

9. The suspension system of claim 1, wherein the wheel arm further includes a flange, the flange mounted on the wheel arm proximate the pivot end of the wheel arm, the flange including the arm shock pivot, and the arm bearing of the shock hingably mounts to the flange of the wheel arm at the arm shock pivot.

10. A suspension system for a bicycle trailer comprising;
    a trailer frame including a shock base and an arm base,
       the shock base having a shock base pivot,
       the arm base having an arm base pivot;
    a wheel arm mounted above the trailer frame, the wheel arm having a hub end, a pivot end and an arm flange,
       the pivot end hingably connected to the arm base pivot;
    a wheel hub received into the wheel arm, proximate the hub end of the wheel arm;
       the arm flange mounted on the wheel arm proximate the pivot end, the arm flange
       including an arm shock pivot; and
    a shock including a base bearing and an arm bearing,
       the shock having a compressible length,
       the base bearing hingably mounted to the shock base pivot,
       the arm bearing hingably mounted to the flange at the arm shock pivot, and
       the shock for dampening the hinging of the wheel arm; and
    an arm bumper mounted to the trailer frame, the arm bumper for contacting the wheel arm as the wheel arm hinges above the trailer frame.

11. The suspension system of claim 10, wherein the trailer frame further comprises:
    a second shock base and a second arm base,
       the second shock base having a second shock base pivot,
       the second arm base having a second arm base pivot;
    a second wheel arm having a second hub end, a second pivot end and a second arm flange,
       the second pivot end hingably connected to the second arm base pivot;
    a second wheel hub received into the second wheel arm, proximate the second hub end of the second wheel arm;
    the second arm flange mounted on the second wheel arm proximate the second pivot end, the second arm flange including a second arm shock pivot; and a second shock including a second base bearing and a second arm bearing,
the second shock having a compressible length,
the second base bearing hingably mounted to the second shock base pivot,
the second arm bearing hingably mounted to the second flange at the second arm shock pivot, and
the second shock for dampening the hinging of the second wheel arm; and a second arm bumper mounted to the trailer frame, the second arm bumper for contacting the second wheel arm as the second wheel arm hinges above the trailer frame.

12. The suspension system of claim 10, wherein a wheel rotates on the wheel hub.

13. The suspension system of claim 11, wherein a second wheel rotates on the second wheel hub.

14. A suspension system for a bicycle trailer comprising:
a trailer frame including a shock base and an arm base,
the shock base having a shock base pivot,
the arm base having an arm base pivot;
a wheel arm mounted above the trailer frame, the wheel arm having a hub end, a pivot end and an arm flange,
the pivot end hingably connected to the arm base pivot;
a wheel hub received into the wheel arm, proximate the hub end of the wheel arm;
the arm flange mounted on the wheel arm proximate the pivot end, the arm flange including an arm shock pivot; and
a shock including a base bearing and an arm bearing,
the shock having a compressible length,
the base bearing hingably mounted to the shock base pivot,
the arm bearing hingably mounted to the flange at the arm shock pivot, and
the shock for dampening the hinging of the wheel arm; and a frame bumper mounted to the wheel arm, the frame bumper for contacting the trailer frame as the wheel arm hinges above the trailer frame.

15. The suspension system of claim 14, wherein the trailer frame further comprises:
a second shock base and a second arm base,
the second shock base having a second shock base pivot,
the second arm base having a second arm base pivot;
a second wheel arm having a second hub end, a second pivot end and a second arm flange,
the second pivot end hingably connected to the second arm base pivot;
a second wheel hub received into the second wheel arm, proximate the second hub end of the second wheel arm;
the second arm flange mounted on the second wheel arm proximate the second pivot end, the second arm flange including a second arm shock pivot; and
a second shock including a second base bearing and a second arm bearing,
the second shock having a compressible length,
the second base bearing hingably mounted to the second shock base pivot,
the second arm bearing hingably mounted to the second flange at the second arm shock pivot, and
the second shock for dampening the hinging of the second wheel arm; and
a second frame bumper mounted to the second wheel arm, the second frame bumper for contacting the trailer frame as the second wheel arm hinges above the trailer frame.

16. The suspension system of claim 14, wherein a wheel rotates on the wheel hub.

17. The suspension system of claim 15, wherein a second wheel rotates on the second wheel hub.

* * * * *